UNITED STATES PATENT OFFICE.

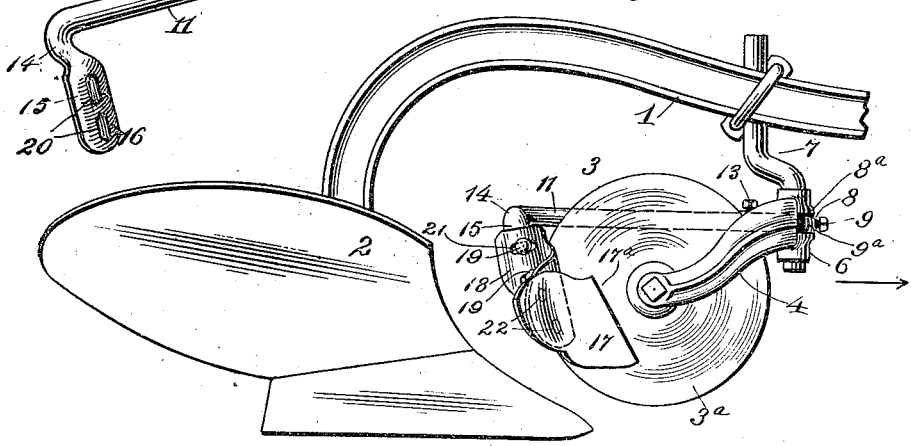

HARRY S. DICKINSON, OF MOLINE, ILLINOIS, ASSIGNOR TO MOLINE PLOW COMPANY, A CORPORATION OF ILLINOIS.

COMBINED COLTER AND JOINTER.

1,244,714.  Specification of Letters Patent.  Patented Oct. 30, 1917.

Application filed August 4, 1916. Serial No. 113,103.

*To all whom it may concern:*

Be it known that I, HARRY S. DICKINSON, a citizen of the United States, residing at Moline, in the county of Rock Island and State of Illinois, have invented certain new and useful Improvements in Combined Colters and Jointers, of which the following is a specification, reference being had therein to the accompanying drawing.

This invention relates to a combined colter and jointer for plows, and the invention consists in an improved manner of mounting the jointer on the colter support to enable the jointer to be adjusted and firmly held in various different positions relative to the colter to meet the varying conditions encountered in the use of the device in the field, the invention being applicable to walking or riding plows either single or gang.

In accordance with my invention, the jointer is in the form of a blade or cutter sustained at and adjacent the furrow side of the colter by sustaining means of improved form, receiving support from the colter support and sustaining the jointer in such position that it will act in rear of the slicing or cutting edge of the colter to trim off the upper corner of the furrow slice in advance of the plow. As a result, when the main furrow slice is turned by the plow, the trimmed off portion, usually carrying trash or vegetation, will be turned under at the bottom of the furrow, and clean and uniform furrows free from exposed or protruding trash or vegetation will be formed.

In the accompanying drawings:

Figure 1 is a side elevation of a mold board plow and the rear portion of the plow supporting beam, the same being equipped with a combined colter and jointer embodying my invention.

Fig. 2 is a side elevation, on an enlarged scale, of the combined device detached from the beam, the view being taken from the land side.

Fig. 3 is a top plan view of the parts shown in Fig. 2.

Fig. 4 is a horizontal sectional plan view, on an enlarged scale, on the line $a$—$a$ of Fig. 2.

Fig. 5 is a similar view on the line $b$—$b$ of Fig. 2.

Fig. 6 is a perspective view of the jointer supporting arm detached.

Referring to the drawings:

1 indicates the rear portion of a plow beam and 2 a mold board plow carried thereby.

3 indicates a rolling colter comprising a colter disk $3^a$ mounted to rotate between the arms of a colter yoke 4, the forward end of which is provided with a hub 6 loosely encircling and swiveling on the lower end of a vertical colter standard 7 firmly clamped to the beam in the usual manner. The hub is loosely confined on the standard by means of a collar 8 seated in a recess $8^a$ in the hub, and clamped to the standard by means of a set screw 9, which collar is formed with stop lugs $9^a$ to limit the side swing of the yoke in its swiveling movements on the standard.

In applying a jointer to a colter of this type, in accordance with my invention, I provide a jointer supporting arm 11 which extends in a fore and aft direction at the side of the disk and on the land side of the same. The forward end of the arm 11 fits loosely in a horizontal fore and aft socket 12 projecting laterally from one of the arms of the colter yoke near its forward end, and is adjustably confined in the socket by means of set screws 13, 13 extending through the socket wall and engaging the jointer arm, by which means the arm may be adjusted in the socket bodily in a fore and aft direction, and also about its longitudinal axis, for the purpose presently to be described. At its rear end the jointer supporting arm extends laterally beyond the rear edge of the colter disk to the furrow side of the same as at 14, and is then extended vertically downward and terminates in the form of a supporting finger 15 whose face is rounded or convex to form a seat 16, as shown more particularly in Figs. 3 and 5. This finger gives support to a jointer 17 through the medium of a jointer frog 18 which is connected respectively to the jointer and supporting finger in such manner as to admit of various adjustments of the jointer relative to the colter.

As shown more particularly in Figs. 3 and 5 the jointer consists of a blade provided with a forward inclined cutting edge $17^a$ lying adjacent the face of the colter disk, from which point the blade curves outwardly and away from the disk so as to present a forward face somewhat in the nature of the mold board of a plow. The jointer frog 18 is of general V-form comprising a laterally extending supporting member 18ª and a connected fore and aft extending member 18ᵇ. The member 18ᵇ is curved or rounded so as to conform to the rounded face of the supporting finger 15, the member 18ᵇ being adjustably connected with the supporting finger by means of upper and lower fastening bolts 19 extending through vertical slots 20 in the supporting finger and through horizontal slots 21 in the member 18ᵇ.

As a result of such connection of the frog with the colter supporting arm, the former may be adjusted vertically relative to the supporting finger, also horizontally in a fore and aft direction, and also about a horizontal transverse axis and a vertical axis, as will be more fully described hereinafter. The jointer blade is seated at its rear side against the forward face of the member 18ª of the frog and firmly secured thereto in any suitable manner, as by the fastening bolts 22.

It will be observed from the foregoing construction that due to the manner of supporting the jointer by the jointer supporting arm through the medium of the frog 18 adjustably connected with the arm, which latter is in turn adjustably connected with the colter supporting yoke, all of the various adjustments of the jointer blade relative to the colter such as are required in the practical operation of the device in the field may be effected. For instance by loosening the fastening bolts 13 which hold the forward end of the colter supporting arm in the socket 12, the said arm may be adjusted within the socket horizontally in a fore and aft direction which will correspondingly adjust the jointer blade to or from the axis of the colter; and by turning the colter supporting arm 11 in the socket about the longitudinal axis of the arm, the jointer blade may be set in different positions to and from the face of the colter and be caused to assume different inclinations with respect to the vertical plane of the colter. By first loosening the fastening bolts 19, the jointer blade may be adjusted vertically with reference to the colter by shifting the bolts in the vertical slots in the supporting finger 15; and by shifting the member 18ᵇ of the frog horizontally on the rounded face of the supporting finger, the jointer blade may be adjusted to different positions to and from the face of the colter as shown by the arrow in Fig. 5, the jointer blade in this adjustment moving around a vertical axis about the center of the arc or curvature of the rounded face of the supporting finger. Also the jointer blade may be tipped about a horizontal axis to vary its inclination with respect to the vertical by shifting the member 18ᵇ of the frog on the rounded face of the finger 15 so as to carry the upper horizontal slot in the member 18ᵇ in one direction and the lower horizontal slot in the opposite direction relatively to the bolts.

The jointer blade is therefore capable of adjustment universally and in all directions with respect to the colter, and it may be held in its various adjustments rigidly and firmly to its work.

It will be noted that the jointer is sustained at one side of the colter by jointer supporting means extending at the opposite side only of the colter, that is the land side, the jointer supporting arm extending upwardly and outwardly away from the moving furrow slice. As a result of this construction there is no liability of the collection by the parts of trash or vegetable growth.

The colter and jointer, combined as described, constitutes in effect a unitary structure, and after the jointer has been connected with the colter and given its proper set and position relative to the same in the shops, the combined device may be applied as usual to the plow beam in proper relation to the plow without requiring any further adjustment or fixing of the jointer. While I have shown the colter in the form of a rotary colter disk, it will be manifest that the invention is applicable as well to a colter of the well known blade form.

In the foregoing description and accompanying drawings I have disclosed my invention in the particular form and detailed construction which I prefer to adopt but it will be understood that these details may be variously changed and modified without departing from the limits of my invention. Further it will be understood that the invention is not limited to any particular form or construction of the parts except in so far as such limitations are specified in the claims.

Having thus described my invention, what I claim is:

1. In a combined colter and jointer, the combination of a colter yoke provided with a fore and aft extending socket, a colter mounted on said yoke, a fore and aft extending jointer supporting arm mounted for endwise movement in said socket, releasable means sustained by the said socket for holding said suporting arm fixedly in the socket, and a jointer carried by the supporting arm.

2. In a combined colter and jointer, the combination of a colter yoke provided with a fore and aft extending socket, a colter mounted on said yoke, a fore and aft extending jointer supporting arm rotatably mounted in said socket, releasable means sustained by the said socket for holding the supporting arm fixedly in the socket, and a jointer carried by the supporting arm.

3. In a combined colter and jointer, the combination of a colter yoke formed with rearwardly extending arms between which the colter is mounted, one of said arms being provided with a horizontal fore and aft extending socket projecting laterally therefrom, a fore and aft extending jointer supporting arm movably mounted in said socket, releasable means sustained by the socket and engaging the supporting arm to hold the same fixedly in the socket, and a jointer carried by the supporting arm.

4. In a combined colter and jointer, the combination of a colter support, a colter mounted thereon, a jointer supporting arm mounted on the colter support, a jointer frog attached to the arm and adjustable relatively thereto vertically and also about a horizontal transverse axis, and a jointer applied to said frog.

5. In a combined colter and jointer, the combination of a colter support, a colter mounted thereon, a jointer-supporting arm mounted on the colter support provided on its rear end with a supporting portion having a rounded seat at one side, a jointer frog having a fore and aft extending arm rounded to conform to said seat, releasable means extending through said frog and arm and seat for holding the frog in different positions on the seat, and a jointer applied to the frog.

6. In a combined colter and jointer, the combination of a colter support, a colter mounted thereon, a jointer-supporting arm mounted on the colter support and provided on its rear end with a supporting portion having parallel slots therein, a colter frog seated against said supporting portion of the arm and having parallel slots arranged at right angles to those in the supporting arm, fastening bolts extending through the slots in the frog and arm to secure said parts adjustably in fixed relations, and a jointer applied to said frog.

7. In a combined colter and jointer, the combination of a colter support, a colter mounted thereon, a jointer-supporting arm mounted on the colter support and provided at its rear end with a rounded depending supporting finger, having vertical slots therethrough, a colter frog provided with a rounded surface applied to the finger and having horizontal slots therein adapted to register with the slots in the finger, fastening bolts extending through said registering slots to secure the parts adjustably in fixed relations, and a jointer applied to said frog.

8. In a combined colter and jointer, the combination of a colter support, a colter mounted thereon, a jointer adapted to coöperate with the colter in trimming the corner of the furrow slice, and connections between the jointer and colter support to sustain the jointer in position, said connections being constructed to admit of the adjustment of the jointer relatively to the colter, vertically, also horizontally fore and aft, also transversely to and from the colter, and also about both a vertical axis and a horizontal axis.

In testimony whereof, I have affixed my signature.

HARRY S. DICKINSON.

Copies of this patent may be obtained for five cents each, by addressing the "Commissioner of Patents, Washington, D. C."